(12) United States Patent
Lichtenauer et al.

(10) Patent No.: US 7,813,494 B2
(45) Date of Patent: Oct. 12, 2010

(54) SYSTEM AND METHOD FOR MANAGING DISTRIBUTION FRAMES IN A TELEPHONE NETWORK

(75) Inventors: James R. Lichtenauer, Lenexa, KS (US); Wayne Zhao, Lawrence, KS (US); Zhongjun Wang, Lawrence, KS (US); Ashok Bansal, Kansas City, MO (US); Robert J. Schmitt, Lee's Summit, MO (US); Richard Holman, Springfield, IL (US); James A. Williams, Versailles, MO (US); William W. Williams, legal representative, Versailles, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1196 days.

(21) Appl. No.: 11/417,511

(22) Filed: May 4, 2006

(65) Prior Publication Data
US 2007/0258381 A1 Nov. 8, 2007

(51) Int. Cl.
*H04M 5/00* (2006.01)
(52) U.S. Cl. .................. 379/327; 379/328; 379/325
(58) Field of Classification Search ................ 379/327, 379/328, 325
See application file for complete search history.

(56) References Cited

U.S. PATENT DOCUMENTS

| | | | | |
|---|---|---|---|---|
| 4,782,517 A | | 11/1988 | Bernardis et al. | 379/201 |
| 4,972,453 A | | 11/1990 | Daniel, III et al. | 379/10 |
| 5,355,405 A | * | 10/1994 | Bernstein | 379/246 |
| 5,404,389 A | | 4/1995 | Fukuda et al. | 379/27 |
| 5,491,742 A | | 2/1996 | Harper et al. | 379/201 |
| 5,920,846 A | | 7/1999 | Storch et al. | 705/7 |
| 5,953,389 A | | 9/1999 | Pruett et al. | 379/9 |
| 2003/0068904 A1 | * | 4/2003 | Williams | 439/37 |
| 2003/0086536 A1 | * | 5/2003 | Salzberg et al. | 379/15.02 |

* cited by examiner

*Primary Examiner*—Quynh H Nguyen
(74) *Attorney, Agent, or Firm*—Jackson Walker L.L.P.

(57) ABSTRACT

This disclosure provides a system and method for managing inventory of and space assignment in main distributing frames associated with a telephone network. The system includes a database that stores frame information and a server that uses the database and executes instructions contained in a computer program to maintain current inventory of the frames, including the equipment terminated on the frames and their allocated space. The server assigns the space for terminating new equipment on the frames and allocates the space to balance the load condition on the frames.

22 Claims, 7 Drawing Sheets

SYSTEM AND METHOD FOR MANAGING DISTRIBUTION FRAMES IN A TELEPHONE NETWORK

BACKGROUND OF THE DISCLOSURE

1. Field of the Disclosure

This disclosure relates to management of distribution frames used in telephone networks for providing connectivity between customer lines and switches.

2. Description of the Related Art

Telephone service networks use distributing frames (also referred to as main distributing frames (MDFs) for providing connectivity between the customer telephone lines and the switches that route telephone calls among the various telephone lines. One type of MDF is referred to as the "universal modular distributing frame" and the other as the "conventional distributing frame." These frames are designed for equipment and outside plant cable termination. Universal modular distributing frames are designed to place the equipment and cable terminations in alternating modules of frame lineup. Such MDFs have equal numbers of facility modules and equipment modules and are thus symmetrical in construction and use. The modules or blocks are installed on shelves and tend to have the same vertical dimension. Conventional frames typically have a front and a back side. One side includes a number of vertical sections (verticals) and the other side has a number of horizontal sections or shelves. The outside plant equipment is installed on the verticals and can vary in size, and the line equipment is installed on the horizontal sections. The telephone lines (typically twisted copper pairs) are connected to blocks on the verticals, while the other side is connected to lines coupled to a switch. Each such block typically can accommodate 50-128 pairs of wires. Each frame can house several blocks, thereby enabling each frame to connect to several thousand telephone lines.

Telephone companies typically divide their overall service area, which may spread over several states, into smaller geographical service areas. Each such area typically has a "central office" (CO) (also referred to as the "wire center") that houses the switches and frames for the particular service area. Each CO typically houses a large number of frames that can often serve thousands of customers. To provide telephone lines to new neighborhoods or to disconnect service, requests are made for assignment of blocks and frames. Technicians install new blocks or use currently available blocks according to the assignments made and establish connections between the customer lines and the switch. A central office may include a large number of modular frames and/or conventional frames. Current systems provide management of modular systems by providing certain reports that show available blocks and available shelf spaces for installing the blocks. Such systems are difficult to use and generally do not adequately address the inventory and space assignment or management of the conventional frames.

Thus, there is a need for improved system and method for managing the inventory and space assignment process for frames, including the conventional frames.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals, wherein:

FIG. 4 is an exemplary screenshot of a horizontal view of the selected frame that shows current usage of the line equipment on the selected frame according to one embodiment of the disclosure;

FIG. 5 is an exemplary screenshot of a horizontal view that shows certain details of the installed equipment in the selected frame; and FIG. 6 is an exemplary screenshot of a vertical view that shows certain details of the installed equipment according to one embodiment of the disclosure.

DETAILED DESCRIPTION OF THE EMBODIMENTS

Figure 1:
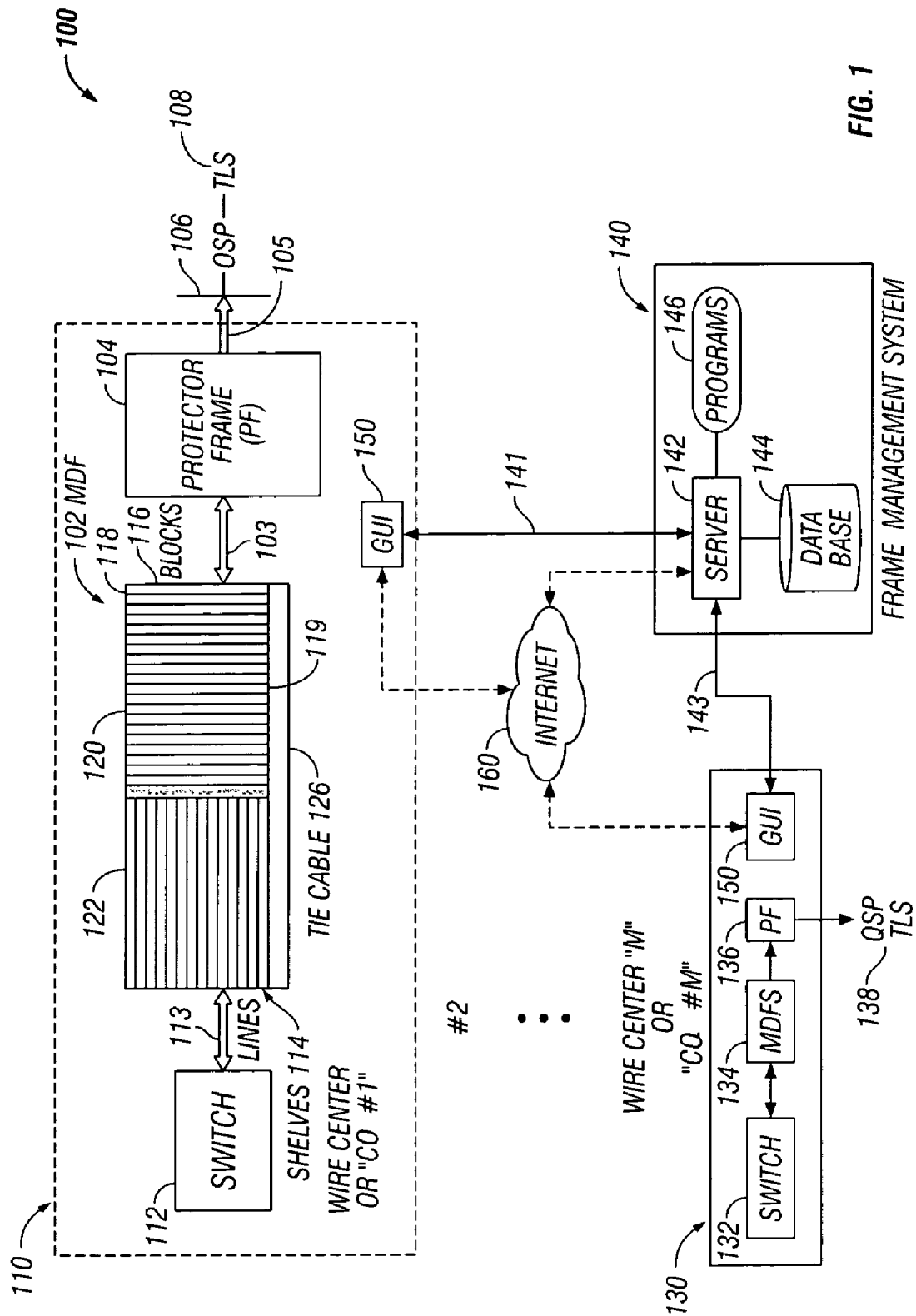
FIG. 1 is a functional diagram of an exemplary telephone network that includes a frame management system according to one embodiment of the disclosure.

In view of the above, the present disclosure through one or more of its various aspects and/or embodiments is presented to provide one or more advantages, such as those noted below.

The present disclosure provides system, methods and computer programs for managing main distributing frames in a telephone network. In one aspect, the system includes: a database that stores inventory information about a plurality of distributing frames, including vertical layout and horizontal layout for each frame in the plurality of frames; a server that has access to a computer program and the database executes instructions contained in the computer program to: select a frame from a plurality of frames in response to an input for terminating connections for a plurality of telephone lines on the selected frame; assign terminating equipment on the selected frame for terminating the plurality of telephone lines on the terminating equipment; and generate and send at least one report to a Graphical User Interface (GUI) that displays the terminating equipment and equipment already in use on the selected frame. In another aspect, the server groups plurality of segments or sections of a frame into zones and assigns space within the selected frame for the termination equipment to balance distribution of the equipment on the selected frame. The server generates a variety of reports, which may be web-based reports, that may include a report that shows a vertical view of the selected frame showing outside plant equipment, a horizontal view of the selected frame showing line equipment associated with a switch that routes telephone calls relating to the plurality of telephone lines, a horizontal and vertical views showing specifications of the equipment, etc. The system maintains in real time inventory of the plurality of frames by location and inventory of equipment type installed on each frame in the plurality of frames. The system further maintains inventory of available space on each of the frames in the plurality of frames. The system also color codes different categories of equipment terminated on each of the frames in the plurality of frames. The frames may be modular/and or conventional frames.

The disclosure also provides one or more computer programs on computer-readable media that is accessible to a server or processor. The computer programs include: instructions to receive input from a Graphical User Interface (GUI) for terminating a plurality of telephone lines on any one of a frame in the plurality of frames: instructions to select a frame from the plurality of frames for terminating the plurality of telephone lines; instructions to assign one or more blocks on the selected frame for terminating the plurality of telephone lines on the frame; and instructions to provide at least one report to the GUI depicting equipment on the selected frame, including the one or more blocks. The computer program may further include: instructions to group a plurality of sections or segments of a selected frame into zones; and instructions to assigns equipment on the selected frame in such zones to balance distribution of the equipment on the selected frame and to enable the use of short jumpers. The computer programs also contain instructions to generate a plurality of reports, which may be web-based reports, to user GUIs via direct connection or via the Internet. The computer program also includes instructions to maintain the inventory of the frames and the equipment assignments for each frame by location.

FIG. 1 is a high level functional diagram of a portion of a telephone network 100 that includes the frame management system 140 according to one embodiment of the disclosure. The network 100 is shown to include a number of central offices (CO) or wire centers, such CO #1 110 through CO #M 130. CO #1 is shown to include a switch 112 coupled to an MDF 102 via cable connections 113. The CO #1 includes a large number of MDFs that may include the conventional MDFs or universal modular MDFs. For ease of explanation and understanding, only one conventional frame is shown and described in reference to FIG. 1. The disclosure provided herein, however, is equally applicable to additional frames in the system. Frame 102 includes a number of verticals and can house a variety of connection block sizes. Frame 102 on one side is coupled to protector frame 104 via the cable connections 103 when such a frame is a modular type frame. Protector frame elements are typically integrated into the conventional frames. The Protection panel includes verticals and connectors that correspond to the verticals and connectors in the MDF 102. The frame protector 104 protects the frames, such as frame 102, from electrical power surges, etc. The frame protector 104 connects to the outside plant (OSP) equipment via lines 105, including the various telephone lines collectively designated by numeral 108 to customer premises. The switch 112, frames 102, protector frames collectively designated by numeral 104 are typically located at a central office or wire center 110 that serves a particular geographical area. The telephone network 100, however, typically may contain a number of such similar COs, which are designated herein as CO #1 through CO #M. For example, CO #M 130 also is shown to include a plurality of MDFs, such as MDF 134, a switch 132, and protector frames 136 that are coupled to the OSP and telephone lines (TLs) 138.

Still referring to FIG. 1, frame 102 is shown to have a front side 120 that include verticals, such as verticals 119, each such vertical being adapted to accommodate modules or blocks of varying dimensions. The MDF 102 also is shown to include back side 122 that includes a number of horizontal shelves, such as shelves 114. The blocks placed on the verticals 119 connect to the outside plant equipment for termination of telephone lines while the back side 122 houses equipment that connects to the switch 112. Thus, in general, the frame includes verticals and horizontals on which blocks or modules, such as blocks 116. For conventional frames the block size heights can vary within the same frame. The blocks on the front and back sides are connected by jumper wires to establish the circuit with the switch.

In the beginning, the frame is merely an empty frame. As the need to connect customer telephone lines arise, blocks are installed on selected verticals and shelves. Each block may accommodate 50-128 or so wire pairs. Such wires are connected to one side of the block, while the other side of the block is connected to the switch 112. Such switches collectively route the telephone calls among the various telephone lines in the telephone network 100 and to other outside networks. The blocks are allocated to specific locations within the frame. At any given point in time, multiple frames are in use, each frame being used to a certain capacity. The need to install new lines and to remove the unused lines continuously changes. As thousands of frames located at multiple locations are in current use, the disclosure provides an automated system for the management of the inventory of frames and the equipment associated with such frames and the frame space assignment process.

Still referring to FIG. 1, the disclosure in one aspect provides a web-based system 140 for the management of frame inventory and the frame assignment process. The system 140 includes a server 142, a database 144 and a set of programs 146. The database includes information about the central offices or wire centers of the network 100, such as the address of the CO, identification of each MDF installed in the CO and details about each frame in its current configuration, including for example, the frame number, frame manufacturer, the number of verticals and shelves in the frame, etc. Also stored in the database may be the physical dimensions of the various elements of the frame, such as the spacing between the verticals, dimensions of the blocks and that of other equipment that are accommodated by the frame. As described later, the frames typically can accommodate a variety of equipment, such as blocks, tie cables, blocks for third party telephone providers, etc. The database 144 includes relevant information for such elements.

The system 140 includes computer-readable media that in one aspect stores computer programs 146, which include web-based programs to provide reports, which may be web-based reports. The server 142 has access to the computer programs 146 and executes instructions contained in such programs in conjunction with the database information to perform the methods described herein and to provide the various reports and interfaces contemplated herein. The system 140 generates a variety of reports and provides such reports to user GUIs 150 at each of the COs 110-130. In one aspect, the system 140 provides such reports via direct connections, such as connections 141 and 143. In another aspect, the system 140 may be accessed by the user GUIs via the Internet 160. In either case, the user can access the system by inputting an identification number, such as a password or an IP address. The computer programs 146 include algorithms to manage the inventory of the frames, including that of the various blocks, modules, line connections, line equipment, tie cables, etc. The algorithms also make assignments of the blocks on the frames. In one aspect, the system can divide or group sections or portions of the frames into zones. For example, a selected frame may be divided into several smaller sections. This sectioning can promote short jumper concept. In another aspect the system 140 spreads out the assignment of equipment terminations (such as modules) across the frame to promote substantially even distribution. In another aspect, the system may assign the new terminations starting from a selected point in the frame, such as from the center, for ease of installation and even distribution. This also promotes a short jumper concept, thereby reducing the installation and connection time.

Figure 2:
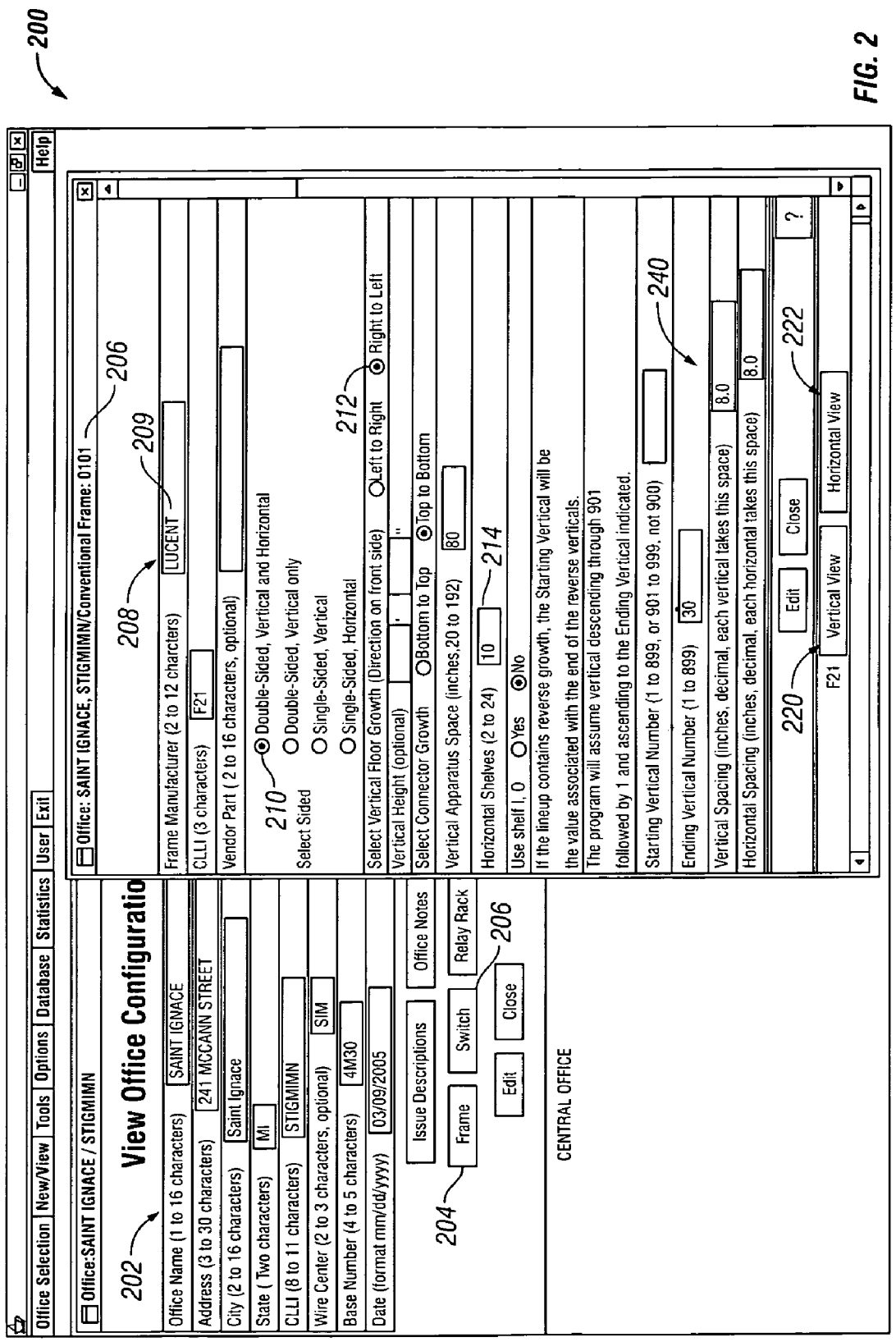
FIG. 2 is an exemplary screenshot showing configuration of a selected frame at a central office provided to users according to one embodiment of the disclosure.

FIG. 2 shows a screenshot 200 of a configuration of a selected frame that is remotely accessible by users, such as users 150. The screenshot 200 is specific to a selected frame (frame 0101) in a selected CO. Section 202 shows information about the CO, such as CO or office name, CO street address, etc. The user may select any CO location by inputting a proper identification number or address of the CO. Since there are a large number of frames in each CO, the user may select a particular frame by clicking at box "frame" 204. The corresponding switch information may be obtained by clicking on box "switch" 206. The information about the particular frame is displayed on the section denoted as 208. The type of frame and the frame number, which in this particular instance is "conventional frame number 0101" is shown by numeral 206. The screenshot 200 also includes other useful information for the technician, such as the name of the manufacturer 208, the type of frame, such as a double-sided vertical and horizontal 210, vertical space in inches (80) and the number of horizontal shelves (for example 10, etc.) as shown by numeral 214. Additional information often useful for technicians and for managing information, such as the ending number of verticals (for example 30), vertical spacing in inches (for example 8 inches) and horizontal spacing, etc. also is provided as shown by numeral 240. The suggested growth direction, such as right-to-left 212 may also be provided. The user 150 may select any number of additional screenshots for viewing the actual configuration and layout of the various sections of the frame. For example, the user may select a vertical view by clicking at 220 or a horizontal view by clicking at 222.

Figure 3:
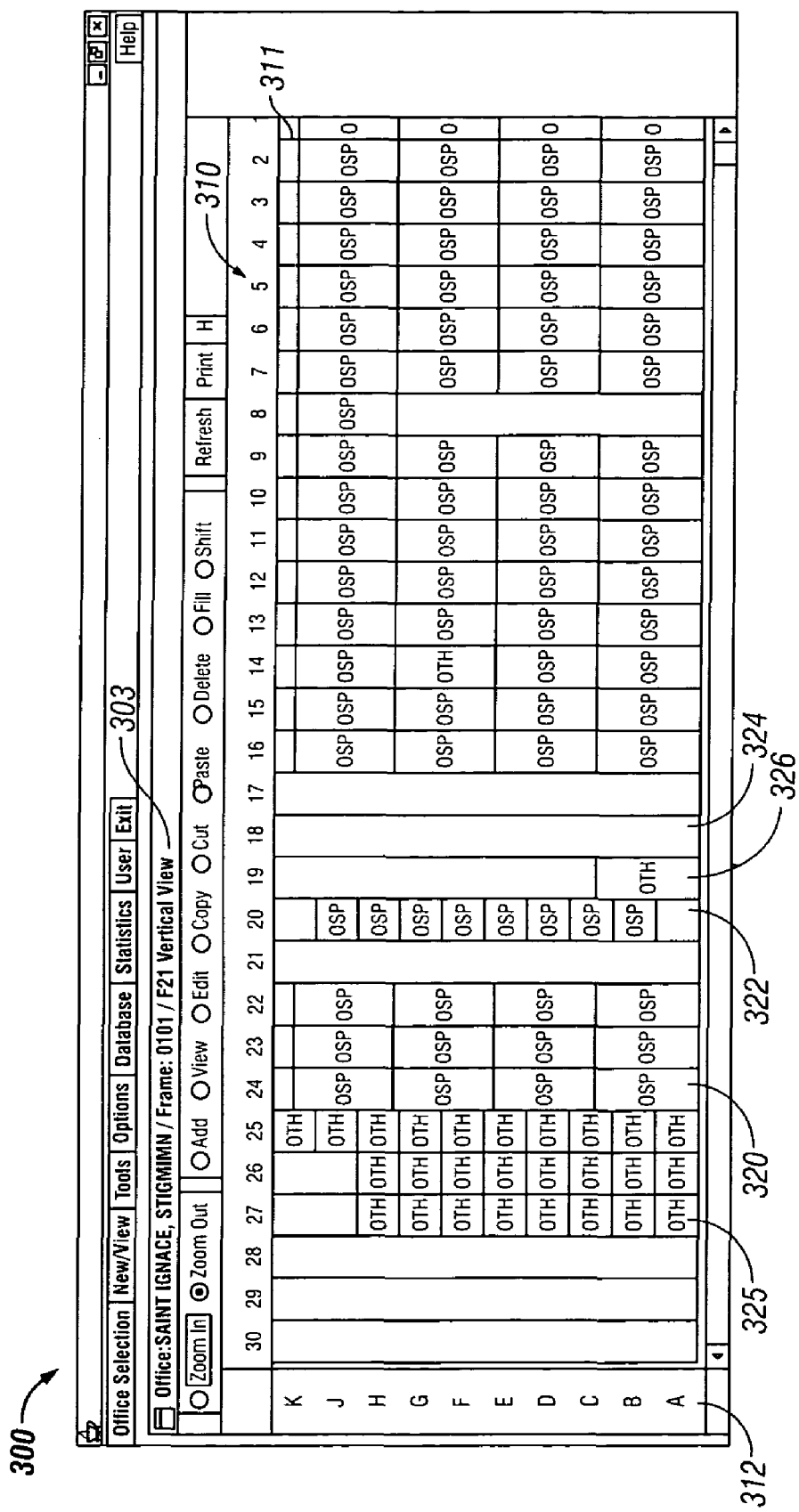
FIG. 3 is an exemplary screenshot of a vertical view of a selected frame that shows current placement of outside plant (OSP) equipment on a selected frame according to one embodiment of the disclosure.

FIG. 3 shows a screenshot 300 of the vertical view 302 for the frame 0101/F21 shown in FIG. 2. The screen shot 300 shows on the top row 310 the verticals ending with number 30 (that corresponds to the information on screenshot of FIG. 2) and on the side column 312 the shelves designated as A-K (which corresponds to the 10 shelves shown in FIG. 2). Screenshot 300 shows the current OSP equipment installed on the particular frame and their respective sizes and location on the verticals. It also shows the unused spaces on the frame for each vertical. The equipment is color-coded as to the type of equipment. For example, OSPs marked as 320 and 322 designate the service provider's blocks that connect to customer telephone lines. The sizes of the OSP 320 and 322 differ and are shown in proportion to the space occupied on the frame. The OSP size in vertical 320 is larger than the OSPs in vertical 322. This visual display enables the planner to make objective judgments about the effectiveness of the use of the frame and to aid the technicians in installing other equipment. The screenshot also shows blocks designated as "OTH" 325 and 326. In this particular example, "OTH" stands for "other" blocks other than those connected to outside telephone lines and may include equipment such as line equipment for connection to the switch and tie blocks that handle cable connections, etc. Such other blocks are shown in a unique color. Additionally, any space not occupied on any vertical is shown as a blank space in a separate color.

Figure 4:
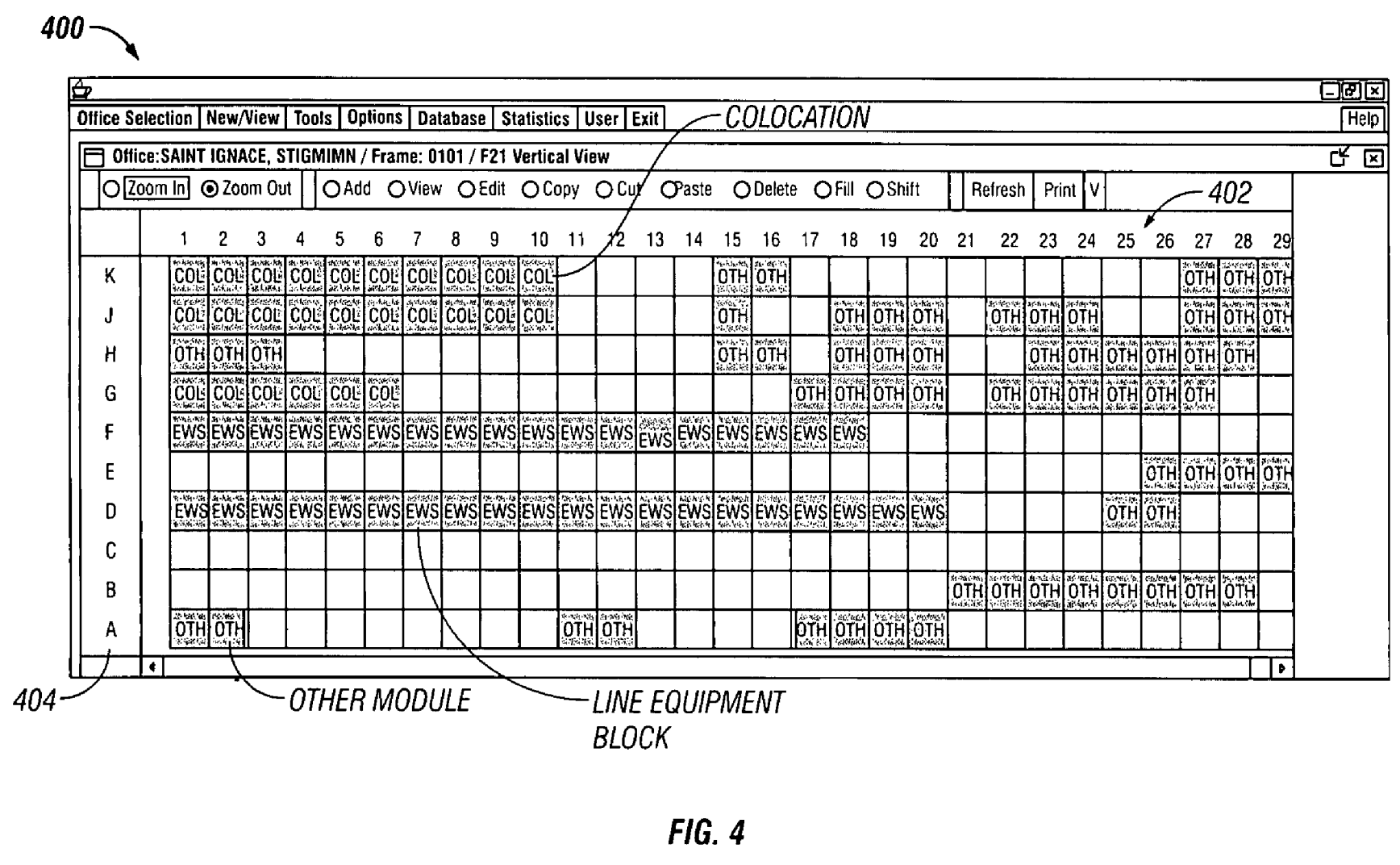

FIG. 4 is a screenshot 400 of the horizontal view of the frame 0101/F21 at a selected time. The 30 verticals that correspond to the verticals of FIG. 2 are labeled along the top row 402, while the 10 shelves are labeled along the vertical column 404. The different types of blocks installed on the frame are shown in different colors. For example, the blocks OSP and OTH are shown in the same color as in FIG. 3, while the blocks designated as COL and EWS are shown in other colors and indicate a particular type of switch. EWS designates blocks that connect to a specific type of line equipment. Other line equipment may have the same color but a further indication for the equipment may be provided. COL designates the blocks that are used by third party service providers, such as competitors.

Figure 5:
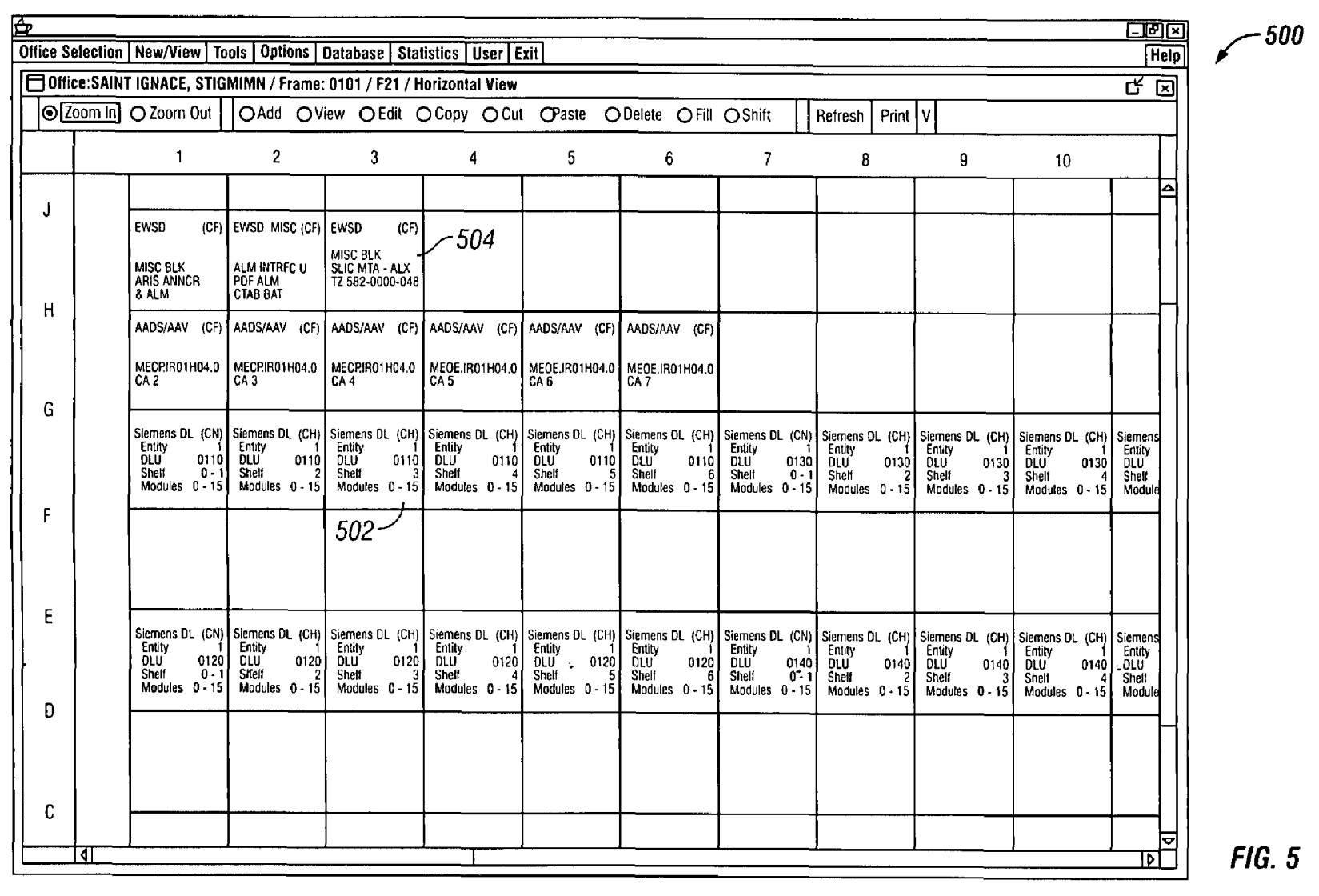

FIG. 5 shows a screenshot 500 of a horizontal view of the selected frame 0101/F21 that shows certain details of the switch. For example block 502 shows that the equipment on shelf F, vertical 3, corresponds or is tied to modules 1-11, which are "Siemens DL" products. Screenshot 500 is a blown-up version for ease of use and can be accessed by a user via the GUI.

Figure 6:
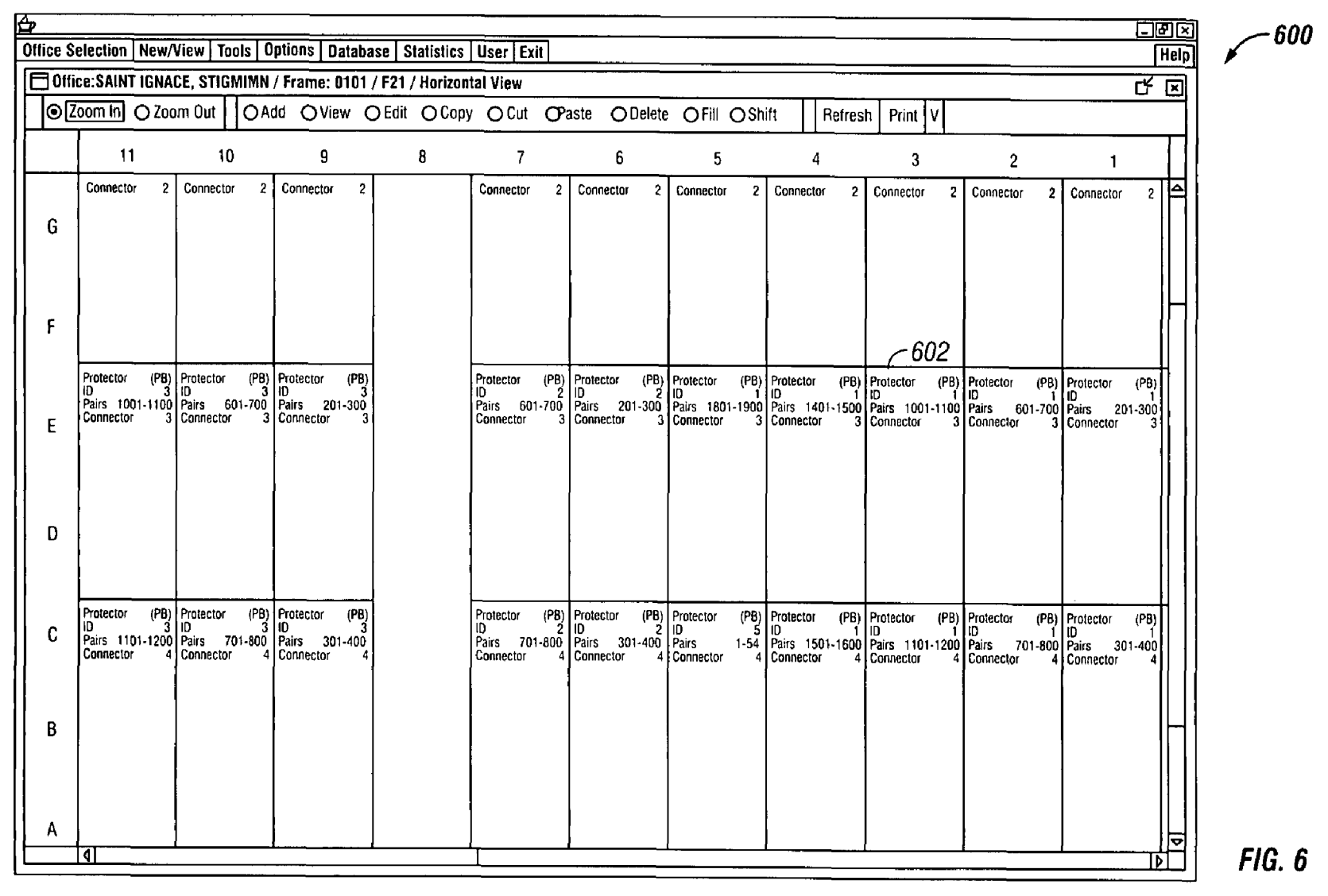

FIG. 6 shows a screenshot 600 of a vertical view of the selected frame 0101 that shows the protector equipment type and the connections made to such protector equipment. For example, block 602 shows that the protector (PB) is connected to pairs 1001-1100 corresponding to the vertical 3, shelf 3.

Referring back to FIG. 1, the system 140 may provide any number of web-based reports to user GUI's that provide visual, color-coded presentation of the layout of the frames and the type of equipment installed on each frame in each CO. This disclosure provides system, methods and computer programs for managing inventory and frame space assignments, including the conventional frames. The disclosure provides a mechanized system, which may be a web-based system, and method for updating conventional frame information in a centralized database for automatic updates. As the new frames and/or new equipment on the frames is needed to be terminated, the algorithms contained in the computer software can group sections of frames or the frames in appropriate zones and spread the terminations or installations across the selected frame for balanced growth within the zone and each frame in the system. The system can maintain real-time inventory of the frames and the components or equipment terminations on the frames, including the space arrangement regardless of the size of the blocks or other equipment. The system 140 further maintains correspondence between the terminated equipment and the equipment manufacturer.

The system and method provides to office personnel and field technician on-line capacity and utilization reports that are remotely accessible from a graphical user interface (GUI), such as a computer, or a portable device. This on-line system enables the deployment of conventional MDFs in multiple lineups similar to the manner in which universal modular main frames are installed. The present system also allows upgrading existing conventional frames by rezoning and cable compression (through the use of short wire concept). It reduces that manual tracking and maintaining frame records. It further eliminates site surveys to verify records for planning and capacity management of the frames. The system may be a web-based or of any other suitable type.

Figure 7:
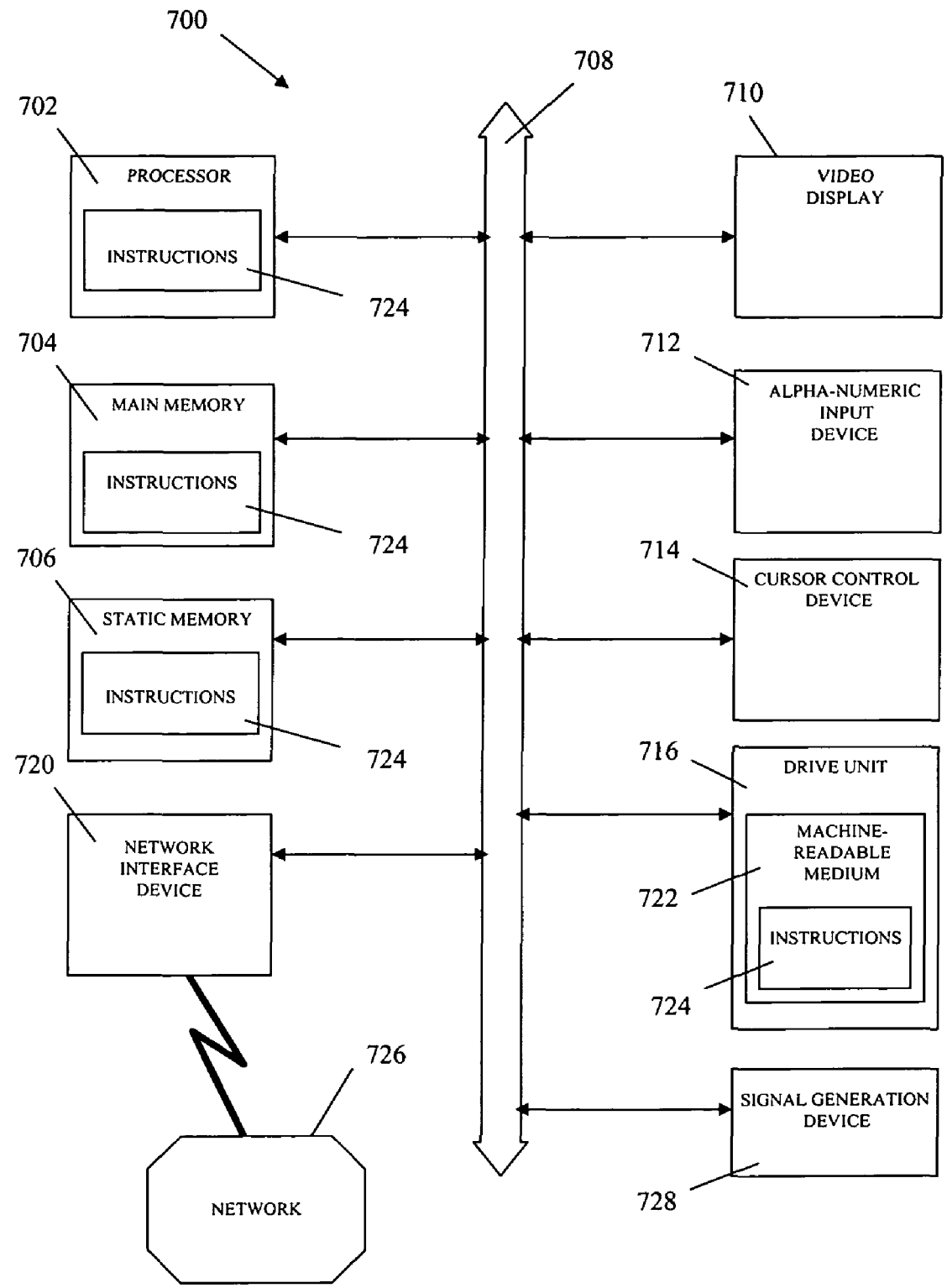
FIG. 7 is a diagrammatic representation of a machine in the form of a computer system within which a set of instructions, when executed, may cause the machine to perform any one or more of the methodologies discussed herein.

The methods and the computer programs described herein relating to management of frame inventory, capacity management and the utilization of the algorithms for assignment, etc. may be implemented by a computer system, such as an exemplary system shown in FIG. 7. FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 750 (e.g., a liquid crystal displays (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the disclosure subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for managing distributing frames in a telephone network, comprising: a database that stores inventory information about a plurality of distributing frames, including vertical layout and horizontal layout for each frame in the plurality of distributing frames; a server having access to a computer program, the server utilizing the computer program and the database to execute instructions contained in the computer program to:

select a frame from a plurality of frames in response to an input for terminating connections for a plurality of telephone lines on the selected frame;

assign space for a terminating equipment on the selected frame for terminating the plurality of telephone lines on the terminating equipment; and generate at least one report, suitable for use with a Graphical User Interface (GUI), wherein the at least one report displays the terminating equipment and equipment already in use on the selected frame and further wherein the at least one report includes:

a report that shows a vertical view of the selected frame showing outside plant equipment; and a report that shows a horizontal view of the selected frame showing line equipment associated with a switch that routes telephone calls relating to the plurality of telephone lines.

2. The system of claim 1, wherein the server further executes instructions to:

group a plurality section of a selected frame into zones; and assign space within the selected frame for the termination equipment to balance distribution of equipment on the selected frame.

3. The system of claim 1, wherein the at least one report further includes a report that shows specifications of the termination equipment at the selected frame.

4. The system of claim 3, wherein each of the reports is a web-based report in form of a screenshot.

5. The system of claim 1, wherein the server further executes instructions to maintain in real time inventory of the plurality of frames by location and inventory of equipment type installed on each frame in the plurality of the frames.

6. The system of claim 1, wherein the server further executes instructions contained in the computer program to maintain inventory of available space on each of the frames in the plurality of frames.

7. The system of claim 1, wherein the server further executes instructions to color code different categories of equipment terminated on each of the frames in the plurality of frames.

8. The system of claim 1, wherein at least some of the frames in the plurality of frames are conventional frames.

9. A non-transitory tangible computer-readable medium embodied with instructions comprising:

instructions to access a database that stores inventory information about a plurality of distributing frames, including vertical layout for each frame in the plurality of distributing frames;

instructions to receive input from a Graphical User Interface (GUI) for terminating a plurality of telephone lines on any one of a frame in the plurality of distributing frames instructions to select a frame from the plurality of distributing frames for terminating the plurality of telephone lines;

instructions to assign one or more blocks on the selected frame for terminating the plurality of telephone lines on the frame;

instructions to provide at least one report to the GUI depicting equipment on the selected frame, including the one or more blocks; and instructions to generate a report that shows a vertical view of the selected frame showing outside plant equipment.

10. The computer-readable medium of claim 9, wherein the computer program further comprises:

instructions to group a plurality sections of a selected frame into zones; and instructions to assigns equipment on the selected frame to balance distribution of the equipment on the selected frame.

11. The computer-readable medium of claim 9, wherein the computer program further comprises:

instructions to generate at least one report that includes a visual representation of equipment on the selected frame; and instructions to color code different type of equipment placed on the selected frame.

12. The computer-readable medium of claim 9, wherein the computer program further comprises:

instructions to generate at least one report that shows specifications for the one or more blocks.

13. The computer-readable medium of claim 9, wherein the computer program further comprises:

instructions to generate a report that shows a horizontal view of the selected frame showing line equipment associated with a switch that routes telephone calls relating to the plurality of telephone lines.

14. The computer-readable medium of claim 13, wherein each of the reports is a web-based report.

15. The computer-readable medium of claim 9, wherein the computer program further comprises:

instructions to maintain in real time inventory of the plurality of frames by location and inventory of equipment type installed on each frame in the plurality of the frames.

16. The computer-readable medium of claim 9, wherein the computer program further comprises:

instructions to maintain inventory of available space on each of the frames in the plurality of frames.

17. The computer-readable medium of claim 9, wherein the computer program further comprises:

instructions to color code different categories of equipment terminated on each of the frames in the plurality of frames.

18. A method for managing inventory of main distributing frames in a telephone network, comprising:

a database that stores inventory information about a plurality of distributing frames, including horizontal layout for each frame in the plurality of distributing frames;

receiving input from a Graphical User Interface (GUI) for terminating a plurality of telephone lines on any one of a frame in the plurality of distributing frames;

selecting a frame from the plurality of distributing frames for terminating the plurality of telephone lines;

assigning one or more blocks on the selected frame for terminating the plurality of telephone lines on the selected frame;

providing at least one report to the GUI depicting equipment on the selected frame, including the one or more blocks; and generating a report that shows a horizontal view of the selected frame showing line equipment associated with a switch that routes telephone calls relating to the plurality of telephone lines.

19. The method of claim 18 further comprising:

grouping sections of a selected frame into zones; and assigning the equipment on the selected frame so as to balance distribution of the equipment on the selected frame.

20. The method of claim 18 further comprising:

generating a report that shows a vertical view of the selected frame showing outside plant equipment.

21. The method of claim 20, wherein each of the reports is a web-based report.

22. The method of claim 20 further comprising:

maintaining in real time inventory of the plurality of frames by location and inventory of equipment type installed on each frame in the plurality of the frames.

* * * * *